US012085795B2

(12) United States Patent
Miyaki

(10) Patent No.: US 12,085,795 B2
(45) Date of Patent: Sep. 10, 2024

(54) DISPLAY DEVICE AND SPEAKER MOUNTING STRUCTURE

(71) Applicant: Funai Electric Co., Ltd., Osaka (JP)

(72) Inventor: Shun Miyaki, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 18/458,203

(22) Filed: Aug. 30, 2023

(65) Prior Publication Data

US 2024/0142813 A1   May 2, 2024

(30) Foreign Application Priority Data

Oct. 26, 2022   (JP) .................................. 2022-171763

(51) Int. Cl.
*G02F 1/1333* (2006.01)
*G02F 1/13* (2006.01)

(52) U.S. Cl.
CPC ...... *G02F 1/133314* (2021.01); *G02F 1/1306* (2013.01); *G02F 1/133317* (2021.01); *G02F 1/133322* (2021.01)

(58) Field of Classification Search
CPC .................................................... G02F 1/1333
See application file for complete search history.

(56) References Cited

U.S. PATENT DOCUMENTS

| 2014/0184928 A1 | 7/2014 | Yokawa et al. |
| 2017/0099452 A1* | 4/2017 | Kita ..................... H05K 5/0247 |

FOREIGN PATENT DOCUMENTS

| JP | 2013-50516 A | 3/2013 | |
| KR | 20070069641 | * 7/2007 | .............. H04M 1/23 |

* cited by examiner

*Primary Examiner* — Sang V Nguyen
(74) *Attorney, Agent, or Firm* — Global IP Counselors, LLP

(57) ABSTRACT

A display device comprises a display, a rear frame, a speaker, and a speaker mounting portion. The rear frame is disposed on a rear side of the display. The speaker includes a speaker frame that is provided on a sound output side from which sound is output. The speaker is mounted to a rear side of the rear frame. The speaker mounting portion mounts the speaker to the rear frame. The speaker mounting portion includes a first portion that holds the speaker and is fixedly attached to the rear frame, and a second portion that is integrally formed with the first portion and is foldable against the first portion. The second portion contacts the speaker frame of the speaker in a folded state in which the second portion is folded against the first portion.

19 Claims, 6 Drawing Sheets

DISPLAY DEVICE AND SPEAKER MOUNTING STRUCTURE

CROSS-REFERENCE TO RELATED APPLICATIONS

This application claims priority to Japanese Patent Application No. 2022-171763 filed in Japan on Oct. 26, 2022. The entire disclosure of Japanese Patent Application No. 2022-171763 is hereby incorporated herein by reference.

BACKGROUND

Field of the Invention

The present invention generally relates to a display device and a speaker mounting structure. More specifically, the present invention relates to a display device and a speaker mounting structure in which a speaker is mounted on a rear side of a rear frame.

Background Information

Conventionally, a display device having a speaker mounted on the rear side of a rear frame is known (see, Japanese Patent Application Publication No. 2013-050516 (Patent Literature 1), for example).

The above Patent Literature 1 discloses a display device comprising a rear frame disposed on the rear side of a display panel and a speaker mounting portion for mounting a speaker on the rear side of the rear frame.

SUMMARY

Although not disclosed in the above Patent Literature 1, it is considered to mount a box speaker with a box surrounding a speaker on the rear frame of the display unit in order to suppress sound output from the speaker from leaking out from other than the output side. However, if a box speaker is mounted on the rear frame, a placement space is required to place the speaker mounting portion and the box on the rear frame. Then, there is a problem that the placement space for placing the speaker becomes larger, compared to a case in which only the speaker is placed. In addition, there is a problem that the number of parts increases by respectively mounting the box and the speaker mounting portion.

One object of the present disclosure is to provide a display device and a speaker mounting structure that can suppress the increase in the number of parts and also suppress the increase in the placement space for placing a speaker.

In view of the state of the known technology, a display device according to a first aspect of the present disclosure comprises a display, a rear frame, a speaker, and a speaker mounting portion. The rear frame is disposed on a rear side of the display. The speaker includes a speaker frame that is provided on a sound output side from which sound is output. The speaker is mounted to a rear side of the rear frame. The speaker mounting portion mounts the speaker to the rear frame. The speaker mounting portion includes a first portion that holds the speaker and is fixedly attached to the rear frame, and a second portion that is integrally formed with the first portion and is foldable against the first portion. The second portion contacts the speaker frame of the speaker in a folded state in which the second portion is folded against the first portion.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

(Configuration of Liquid Crystal Television Device)

Figure 1:
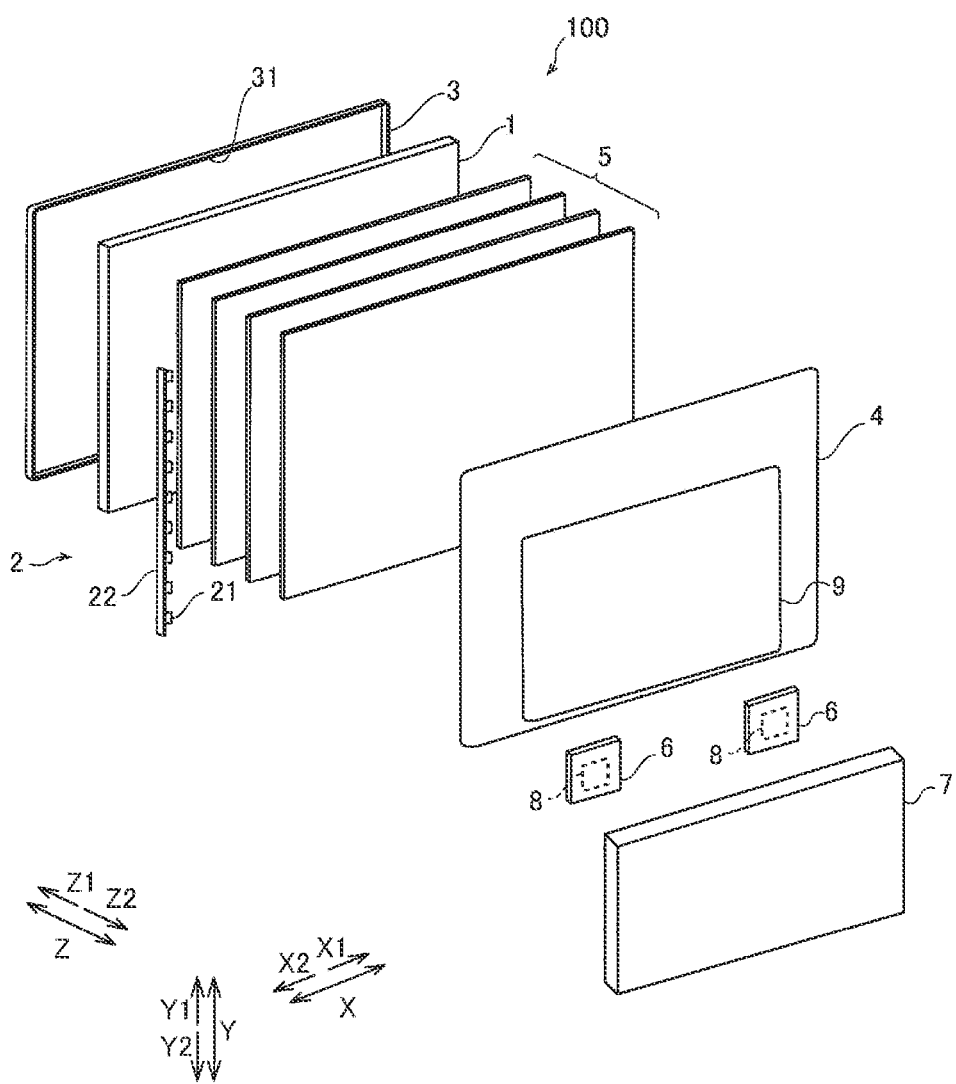
FIG. 1 is an exploded perspective view showing the configuration of a liquid crystal television device according to one embodiment.

With reference to FIG. 1, the configuration of a liquid crystal television device 100 according to one embodiment will be described. The liquid crystal television device 100 is an example of a "display device" of the present disclosure.

As shown in FIG. 1, the liquid crystal television device 100 has a display unit 1 (e.g., a display), a light source 2, a front frame 3, a rear frame 4, a sheet member 5, one or more (two in FIG. 1) speaker mounting portions 6, a cover member 7, one or more (two in FIG. 1) speakers 8, and a substrate 9. The speakers 8 and the speaker mounting portions 6 are mounted on a X2 side (left side) and a X1 side (right side) of the rear frame 4, respectively. Since there is little or no difference in the structures of the left and right speakers 8, these speakers 8 are not distinguished in the following explanation. Thus, the description about one of the speakers 8 (i.e., the speaker 8) can be applied to the other one of the speakers 8. Similarly, since there is little or no difference in the structures of the left and right speaker mounting portions 6, these speaker mounting portions 6 are not distinguished in the following explanation. Thus, the description about one of the speaker mounting portions 6 (i.e., the speaker mounting portion 6) can be applied to the other one of the speaker mounting portions 6. The speaker mounting portions 6 are examples of "a speaker mounting structure" of the present disclosure.

The display unit 1 includes a liquid crystal cell. The display unit 1 includes a plurality of pixels, and each of the plurality of pixels changes the transmittance of light irradiated from the light source 2 to display an image on a display surface of the display unit 1. The display unit 1 is driven based on video or image signals. The display unit 1 is rectangular in shape. The display surface side of the display unit 1 on which the image is displayed is referred to as a front side (Z1 side), and the opposite side of the Z1 side is referred to as a rear side (Z2 side). The thickness direction of the display unit 1 connecting the front side and the rear side is referred to as a Z direction. The longitudinal direction (left-right direction) of the display unit 1 orthogonal to the Z direction is referred to as an X direction, and the shortitudinal direction (up-down direction) of the display unit 1 orthogonal to the Z direction is referred to as a Y direction. In the X direction, the right side when viewed from the rear side to the front side is referred to as the X1 side, and the left side is referred to as the X2 side. In the Y direction, the upper end side of the display unit 1 is referred to as a Y1 side and the lower end side is referred to as a Y2 side.

The light source 2 is disposed on the X2 side of the display unit 1. The light source 2 is configured to irradiates the display unit 1 with light. The light source 2 includes a plurality of LEDs 21 and a light source substrate 22. In FIG. 1, the spacing between the plurality of LEDs 21 arranged on the light source substrate 22 is represented as large, but the spacing may be reduced to increase the number of LEDs 21. Furthermore, the liquid crystal television device 100 can include different types of light sources as needed and/or desired.

The front frame 3 is rectangular in shape. The length of the front frame 3 in the up-down direction (the Y direction) is larger than the length of the display unit 1 in the up-down direction (the Y direction). The length of the front frame 3 in the left-right direction (the X direction) is larger than the length of the display device 1 in the left-right direction (the X direction). The front frame 3 is configured to support the display unit 1 from the front side (the Z1 side). A rectangular-shaped opening 31 is provided in the center portion of the front frame 3 to expose the display surface of the display unit 1 toward the front side (the Z1 side).

The rear frame 4 is rectangular in shape. The rear frame 4 is located on the rear side (the Z2 side) of the display unit 1. The length of the rear frame 4 in the up-down direction (the Y direction) is smaller than the length of the front frame 3 in the up-down direction (the Y direction). The length of the rear frame 4 in the left-right direction (the X direction) is smaller than the length of the front frame 3 in the left-right direction (the X-direction). Therefore, the outer peripheral surface of the rear frame 4 is fixed in contact with the inner peripheral surface of the front frame 3.

The sheet member 5 is provided between the display unit 1 and the rear frame 4. The sheet member 5 includes a plurality of sheets, such as optical sheets. The sheet member 5 includes, for example, a reflective sheet that reflects light irradiated from the light source 2 and a diffusion sheet that diffuses the irradiated light toward the display unit 1.

The speaker mounting portions 6 are attached to the rear frame 4 from the rear side (the Z2 side). The speaker mounting portions 6 are mounted on the lower end side (the Y2 side) of the rear frame 4 that is lower than the center of the rear frame 4 in the up-down direction (the Y direction). The detailed structures of the speaker mounting portions 6 will be described later.

The cover member 7 is rectangular in shape. The length of the cover member 7 in the up-down direction (the Y direction) is smaller than the length of the rear frame 4 in the up-down direction (the Y direction). The length of the cover member 7 in the left-right direction (the X direction) is smaller than the length of the rear frame 4 in the left-right direction (the X direction). The cover member 7 is mounted on the lower end side (the Y2 side) of the rear frame 4 that is lower than the center of the rear frame 4 in the up-down direction (the Y direction). The cover member 7 is configured to cover the substrate 9.

Figure 2:
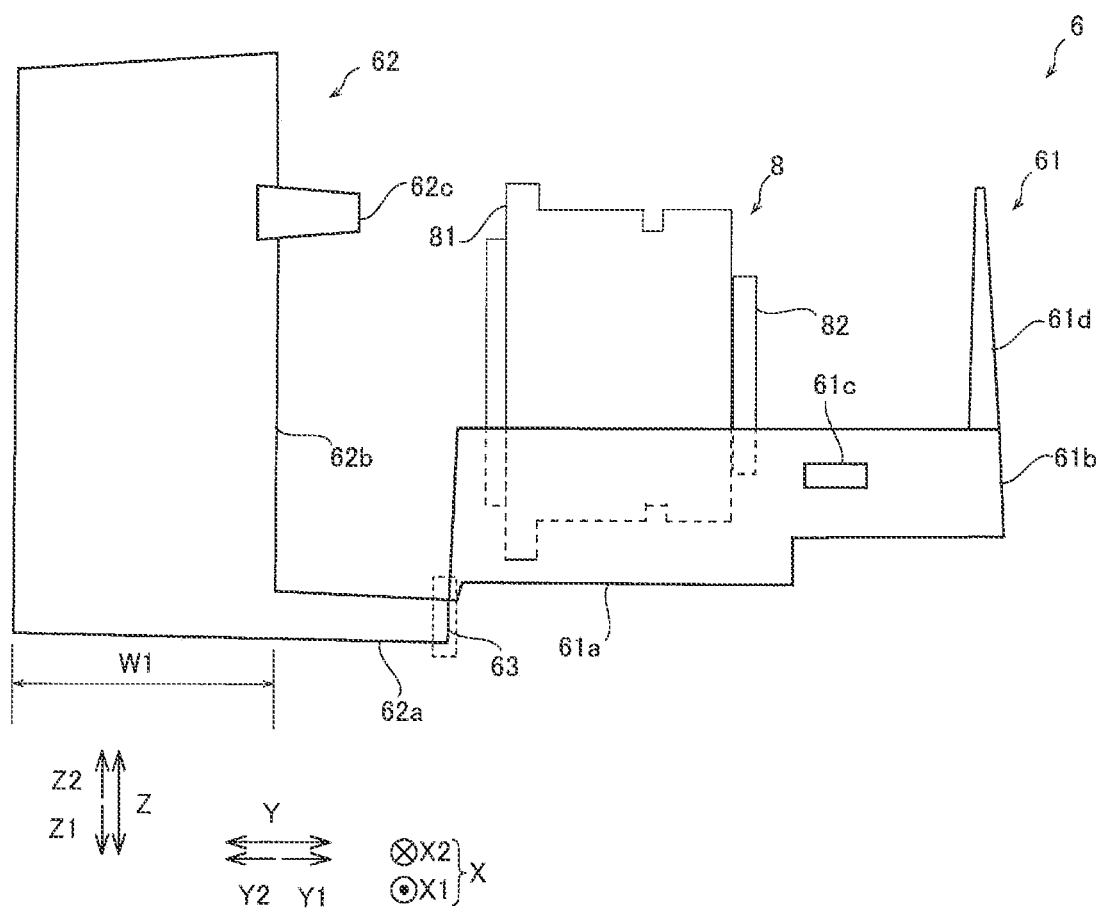
FIG. 2 is a diagram showing a state before a second portion is folded.
Figure 5:
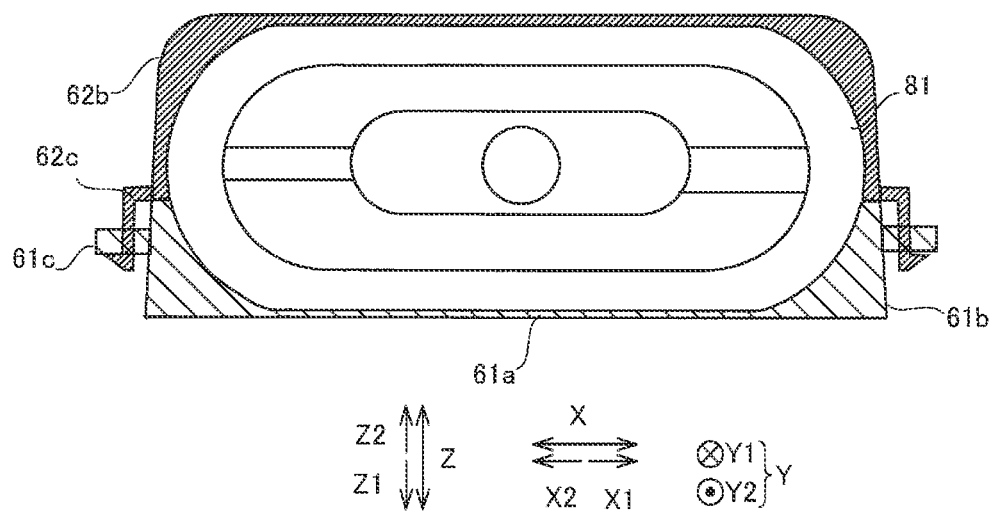
FIG. 5 is a diagram showing a first portion, the second portion and a speaker after the second portion is folded.

As shown in FIG. 2, the speakers 8 each include a speaker frame 81 in which a vibrating portion (not shown) is placed inside, a magnet 82, and a coil (not shown). The speakers 8 output sound when vibrations are generated by the coils and the magnets 82 and the vibrating portions inside the speaker frames 81 further vibrate. The vibrating portions are, for example, a cone paper. The speaker frames 81 are placed on the output sides of the speakers 8 where the sound of the speakers 8 are output. The magnets 82 are placed on the opposite sides of the speaker frames 81 that are opposite to the output sides. The speaker frames 81 have an oval shape when viewed in the Y direction, as seen in FIG. 5. In particular, the speaker frames 81 each have a flange portion that has an oval outer peripheral surface (hereinafter "outer peripheral surface"), as seen in FIG. 5. In the illustrated embodiment, the outer peripheral surface of each of the speaker frames 81 has a pair of flat sections defining straight long sides of the speaker frame 81 and a pair of curved sections defining curved short sides of the speaker frame 81. In the present embodiment, the speakers 8 are attached to the rear frame 4 so that the output sides on which the sound of the speakers 8 are output are located on the Y2 side.

As shown in FIG. 1, the substrate 9 is mounted on a lower portion of the rear frame 4. A control circuit is mounted on the substrate 9. With the substrate 9, the mounted control circuit is electrically connected to the display unit 1 and the speakers 8. The substrate 9 outputs audio signals to the speakers 8 and video or image signals to the display unit 1 by the control circuit.

(Structures of Speaker Mounting Portions)

As shown in FIG. 2, the speaker mounting portions 6 each include a first portion 61 and a second portion 62. The first portion 61 and the second portion 62 are integrally formed by resin. The speaker mounting portions 6 are formed of, for example, polypropylene. The speaker mounting portions 6 each further include a connection portion 63, which is a portion connecting the first portion 61 and the second portion 62. In other words, the first portion 61 and the second portion 62 are integrated via the connection portion 63. Thus, the speaker mounting portion 6 (i.e., the first portion 61, the second portion 62 and the connection portion 63) is integrally formed or integrated as a one-piece, unitary member by resin. The connection portion 63 is configured to be folded or is foldable. In other words, the second portion 62 is foldable against the first portion 61 by folding the connection portion 63. The speaker mounting portions 6 are fixed to the rear frame 4 in an unfolded state in which the second portions 62 are not folded against the first portions 61 (FIG. 2). Then, the speakers 8 are mounted to the speaker mounting portions 6, after which the second portions 62 are folded toward the first portions 61. The rear frame 4 is an example of "another member" of the present disclosure.

Figure 4:
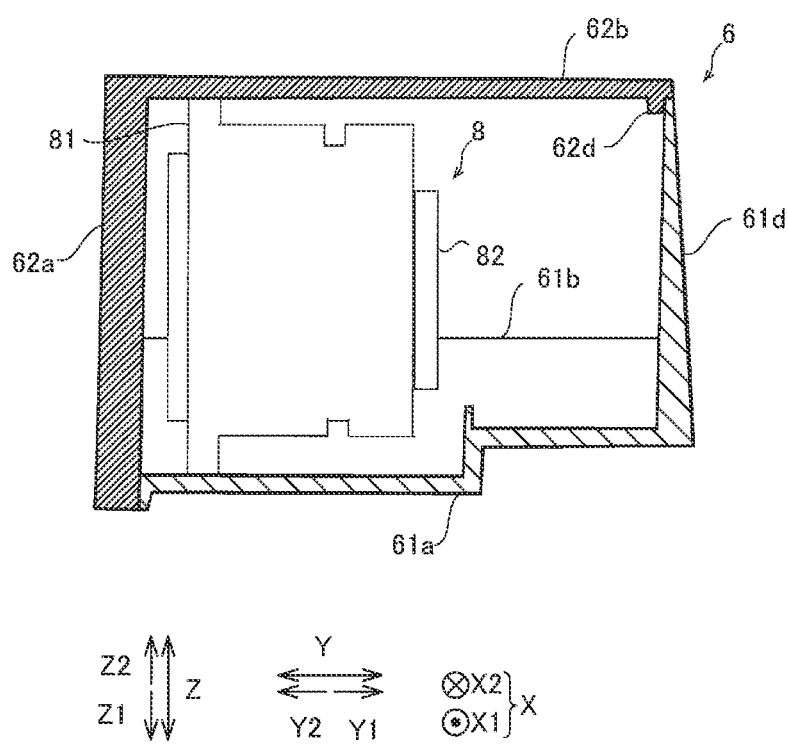
FIG. 4 is a cross-sectional view showing a state after the second portion is folded.

The first portions 61 each include a first flat portion 61*a*, a first wall portion 61*b*, a first engagement portion 61*c*, and a protruding portion 61*d*. Hereinafter, although the configurations of only one of the first portions 61 (i.e., the first portion 61) will be explained, the description about one of the first portions 61 can be applied to the other one of the first portions 61. The first flat portion 61*a* has one surface on which the speaker 8 is mounted. In FIG. 2, the speaker 8 is mounted on the Z2 side surface (the surface facing toward the Z2 side) of the first flat portion 61*a*. In FIG. 2, it is described as if there is a gap between the speaker 8 and the first flat portion 61*a*. However, as shown in FIG. 4, the first flat portion 61*a* (the Z2 side surface of the first flat portion 61*a*) and the speaker 8 are in contact with each other. The speaker mounting portions 6 are attached to the rear frame 4 in a state in which the other surfaces (the Z1 side surfaces facing toward the Z1 side) of the first flat portions 61*a* are in contact with the rear frame 4. The first flat portions 61*a* each have screw holes for fixing to the rear frame 4. The first flat portions 61*a* are fixed to the rear frame 4 by screws. Of course, the first flat portions 61*a* can be fixed to the rear frame 4 in a different manner, as needed and/or desired.

As shown in FIG. 5, the first flat portion 61a contacts the long side of the outer peripheral surface of the speaker frame 81 of the speaker 8 from the Z1 side. The speaker 8 is fixed, for example, to bosses provided on the first flat portion 61a.

As shown in FIG. 5, the first wall portion 61b protrudes in the Z2 direction from the surface of the first flat portion 61a to which the speaker 8 is attached and contacts the short sides of the outer peripheral surface of the speaker frame 81 of the speaker 8. The protruding height (the length in the Z direction) of the first wall portion 61b is smaller than the height (the length in the Z direction) of the speaker 8. The first wall portion 61b is provided to contact at least the side surface of the speaker frame 81. The first wall portion 61b is provided to cover at least the side surface of the speaker frame 81 from the Y direction, and preferably is configured to cover the entire side surface of the speaker 8. Specifically, as shown in hatchings in FIG. 5, the first wall portion 61b contact the speaker frame 81 from the X direction and the Z direction without gaps.

Figure 3:
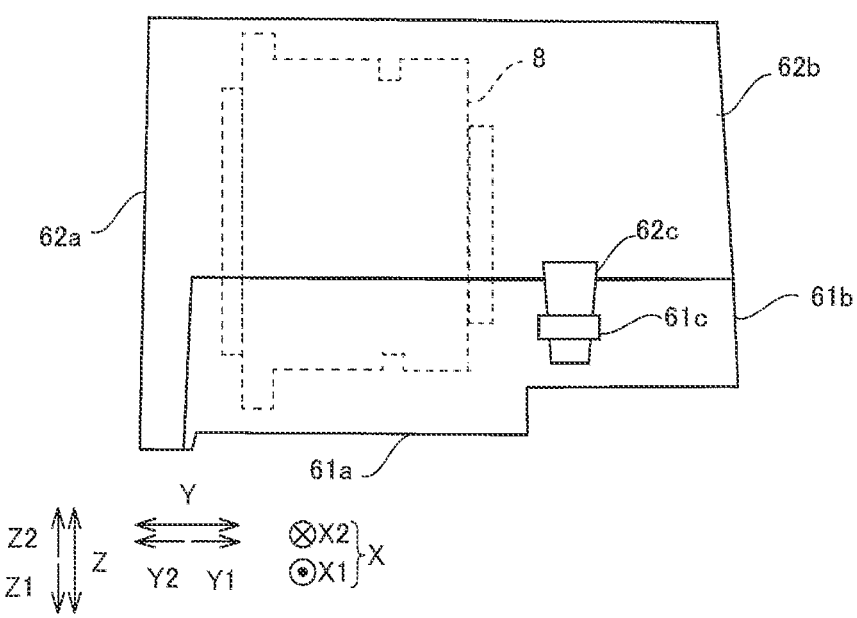
FIG. 3 is a diagram showing a state after the second portion is folded.

As shown in FIGS. 2 and 3, the second portions 62 each includes a second flat portion 62a and a second wall portion 62b. Hereinafter, although the configurations of only one of the second portions 62 (i.e., the second portion 62) will be explained, the description about one of the second portion 62 can be applied to the other one of the second portion 62. The second flat portion 62a is integrally formed with the first flat portion 61a and extends in the Y direction in an unfolded state shown in FIG. 2. The second flat portion 62a is located on the output side (the Y2 side) of the speaker 8 in a folded state in which the second portion 62 is folded against the first flat portion 61a (FIG. 3). The second flat portion 62a may be provided with an opening or a plurality of long holes to prevent the sound output from the speaker 8 from getting muffled. In particular, the second flat portion 62a forms a speaker grill to protect the protect the speaker 8 from foreign objects while allowing sound to clearly pass. The second portion 62 entirely covers the speaker 8 in the folded state, as seen in FIG. 3.

As shown in FIG. 2, the second wall portion 62b has a box shape with an opening that opens on the Y1 side in the unfolded state. As shown in FIG. 3, in the folded state, the peripheral edge portion of the second wall portion 62b that defines the opening contacts the first flat portion 61a to surround the speaker 8. As shown in FIG. 2, in the unfolded state, which is before being folded, the second wall portion 62b protrudes from the second flat portion 62a in a protruding direction that is the same direction (i.e., the Z2 direction) as a protruding direction of the first wall portion 61b in which the first wall portion 61b protrudes from the first flat portion 61a. As shown in FIG. 2, in the unfolded state, the second wall portion 62b has a width W1 in the Y2 direction from a boundary with the second flat portion 62a. The width W1 in the Y2 direction of the second wall portion 62b in the unfolded state becomes the height in the Z direction in the folded state.

As shown in FIG. 3, the second portion 62 is folded toward the first portion 61 from the Y2 side on which an output surface from which the sound of the speakers 8 is output is located. In the folded state, the sum of the height of the second wall portion 62b (i.e., the width W1) and the protruding height of the first wall portion 61b in the Z direction is greater than or equal to the height of the speaker 8 in the Z direction. Preferably, in the folded state, the sum of the height of the second wall portion 62b and the protruding height of the first wall portion 61b in the Z direction is substantially the same as the height of the speaker 8 in the Z direction. The second wall portion 62b is located on the Y2 side relative to a portion of the second flat portion 62a in the unfolded state. The portion of the second flat portion 62a does not overlap with the second wall portion 62b as viewed in the Z direction in the unfolded state, as shown in FIG. 2. In other words, the second wall portion 62b is not provided at the portion of the second flat portion 62a. The portion of the second flat portion 62a is in contact with the Y2 side of the first wall portion 61b in the folded state, as shown in FIG. 3.

As shown in FIG. 5, the second wall portion 62b contacts the long side and the short sides of the outer peripheral surface of the speaker frame 81 of the speaker 8 in the folded state. The second wall portion 62b are provided to cover at least the side surface of the speaker frame 81 in the Y direction, and is preferably configured to cover the entire side surface of the speaker 8. The speaker 8 is fixed to the speaker mounting portion 6 in a state in which the speaker 8 is sandwiched between the first flat portion 61a and the second wall portion 62b. In this state, the second wall portion 62b is in contact with the long side of the outer peripheral surface of the speaker frame 81. Specifically, as shown with the hatchings in FIG. 5, the first wall portion 61b and the second wall portion 62b have thick portions or ribs that protrude in the X direction. In particular, the thick portions of the first wall portion 61b and the second wall portion 62b have inner surfaces that correspond to the short sides of the outer peripheral surface of the speaker frame 81 of the speaker 8 in the folded state. Thus, the first flat portion 61a, the first wall portion 61b and the second wall portion 62b contact the outer peripheral surface of the speaker frame 81 from the X direction and the Z direction without gaps. In the illustrated embodiment, the thick portions of the first wall portion 61b and the second wall portion 62b have curved inner surfaces that correspond to the short sides (i.e., curved short sides) of the outer peripheral surface of the speaker frame 81 of the speaker 8 in the folded state. As a result, the speaker frame 81 (e.g., the flange portion of the speaker frame 81) can separate an interior space of the speaker mounting portion 6 into the Y1 side and the Y2 side, as seen in FIG. 4. Thus, the sound output from the Y2 side of the speaker 8 can be prevented from being muffled or interfered by the sound leaked from the Y1 side of speaker 8. In FIG. 5, the second flat portion 62a located on the Y2 side of the speaker 8 is omitted to show the contact state between the speaker frame 81 and the speaker mounting portion 6.

As shown in FIG. 5, the first wall portion 61b has one or more (two in FIG. 5) first engagement portions 61c that are integrally formed with the first wall portion 61b, and the second wall portion 62b has one or more (two in FIG. 5) second engagement portions 62c that are integrally formed with the second wall portion 62b. The first engagement portions 61c are engaged with the second engagement portions 62c, respectively, in the folded state. The first engagement portions 61c are engaged with the second engagement portions 62c, respectively, with snap-fits, for example. In this case, the first engagement portions 61c each include a protrusion with a catch, and the second engagement portions 62c each include a hook that is engaged with the catch in the folded state.

As shown in FIG. 4, opposing portions of the first portion 61 and the second portion 62 closely contact with each other in the folded state in which the second portion 62 is folded with respect to the first portion 61. Specifically, as shown in FIG. 4, the first portion 61 includes the protruding portion 61d protruding in the Z2 direction from the first wall portion 61b, and the second portion 62 includes a stepped portion 62*d* provided within the second wall portion 62*b*. In the folded state, opposing surfaces of the protruding portion 61*d* and the stepped portion 62*d* extending along the Y direction contact with each other, and opposing surfaces of the protruding portion 61*d* and the stepped portion 62*d* along the Z direction contact with each other. Thus, in the folded state, the first portion 61 and the second portion 62 are in contact with each other at both the opposing surfaces along the Y direction and the opposing surfaces along the Z direction that are continuous to each other, and the first portion 61 and the second portion 62 can closely contact with each other without gaps.

The connection portion 63 is a portion that are enclosed by the dashed square in FIG. 2. The connection portion 63 extends in the Z direction and the X direction from the second flat portion 62*a* of the second portion 62, and is continuous to the first flat portion 61*a* of the first portion 61. The connection portion 63 has a notch extending along the Z direction to facilitate folding.

Effect of this Embodiment

The following effects can be achieved in this embodiment.

As described above, the first portion 61 is fixed to the rear frame 4. The second portion 62 is folded against the first portion 61 at the connection portion 63 connected to the first portion 61 and contacts the side surface of the speaker frame 81 of the speaker 8 in the folded state. The first portion 61 and the second portion 62 are integrally formed. This allows the first portion 61 that is integrally formed with the second portion 62 to fix the speaker 8 to the rear frame 4 while suppressing sound leakage by the second portion 62 that is in contact with the side surface of the speaker frame 81 of the speaker 8. As a result, unlike the case when a box speaker is attached, it is not necessary to respectively provide a box and a mounting member, and the increase in the number of parts can be suppressed and the placement space for placing the speaker 8 can be suppressed from becoming larger.

As described above, the opposing portions of the first portion 61 and the second portion 62 closely contact each other in the folded state. As a result, the formation of a gap between the first portion 61 and the second portion 62 can be suppressed, and thus sound leakage can be effectively suppressed.

As described above, the first portion 61 includes the first wall portion 61*b* that protrudes from the surface on which the speaker 8 is mounted and contacts the outer peripheral surface of the speaker frame 81 of the speaker 8. The second portion 62 includes the second wall portion 62*b* that contacts the outer peripheral surface of the speaker frame 81 of the speaker 8 in the folded state and protrudes in the protruding direction that is the same as the protruding direction of the first wall portion 61*b*. The opposing portions of the first wall portion 61*b* and the second wall portion 62*b* closely contact to each other in the folded state. This allows the first wall portion 61*b* that is in contact with the outer peripheral surface of the speaker frame 81 of the speaker 8 to suppress sound leakage from the speaker 8. In addition, the first wall portion 61*b* and the second wall portion 62*b* are in close contact with each other, thereby more effectively suppressing the occurrence of sound leakage.

As described above, the speaker frame 81 has an oval shape, and the second portion 62 is configured to surround at least the outer peripheral surface of the speaker frame 81. This allows sound leakage to be suppressed by the second portion 62 surrounding at least the outer peripheral surface of the speaker frame 81 from which sound is output. If the second portion 62 surrounds only the outer peripheral surface of the speaker frame 81, the second portion 62 can be suppressed from becoming larger compared to the case in which it surrounds the entire speaker 8. In addition, since the speaker frame 81 has an oval shape, the second portion 62 can be brought into contact with the speaker frame 81 even when the second portion 62 has a flat plate because the speaker frame 81 has a straight portion unlike the case where the speaker frame 81 is circular.

As described above, the second portion 62 contacts the straight portion of the long side and the short sides of the speaker frame 81 having an oval shape. This allows the second portion 62 and the speaker frame 81 to closely contact to each other because contacting portion where the second portion 62 and the speaker frame 81 are in contact with each other can be increased by making the contacting portion the straight portion.

As described above, the first wall portion 61*b* has the first engagement portions 61*c* that are integrally formed with the first wall portion 61*b* and the second wall portion 62*b* has the second engagement portions 62*c* that are integrally formed with the second wall portion 62*b*. The first engagement portions 61*c* and the second engagement portions 62*c* are configured to be engaged with each other in the folded state. This allows the first engagement portions 61*c* and the second engagement portions 62*c* to maintain the first wall portion 61*b* and the second wall portion 62*b* in close contact.

MODIFICATIONS

The embodiments disclosed herein are just examples in every respect, and should not be interpreted as being limiting in nature. The scope of the invention is indicated by the claims rather than by the above description of the embodiments, and all modifications (modification examples) within the meaning and range of equivalency of the claims are included.

For example, an example is shown in which the display unit is a liquid crystal television device, but the invention is not limited to this. For example, the display unit may be a car navigation system.

In the above embodiment, an example is shown in which the first portion and the second portion are integrally formed by resin, but the invention is not limited to this. For example, the first portion and the second portion may be formed of metal, as long as the material is foldable.

In the above embodiment, an example is shown in which the speaker outputs sound downward, but the invention is not limited to this. For example, the speaker may output sound toward the rear side or output sound toward the upper side.

In the above embodiment, an example is shown in which the notch is provided in the connection portion to be folded, but the invention is not limited to this. For example, the thickness of the connection portion to be folded may be reduced to facilitate folding.

In the above embodiment, an example is shown in which the first portion includes the first wall portion and the second portion includes the second wall portion, but the invention is not limited to this. For example, only one of the first wall portion or the second wall portion may be formed.

In the above embodiment, an example is shown in which the speaker frame has an oval shape, but the invention is not limited to this. For example, the speaker frame may be circular or elliptical in shape. In this case, the first portion and the second portion may be curved to closely contact the speaker frame.

In the above embodiment, an example is shown in which the first portion and the second portion are engaged with each other by the first engagement portions and the second engagement portions, but the invention is not limited to this. For example, screw holes may be provided in the first portion and the second portion for screw fastening.

Figure 6:
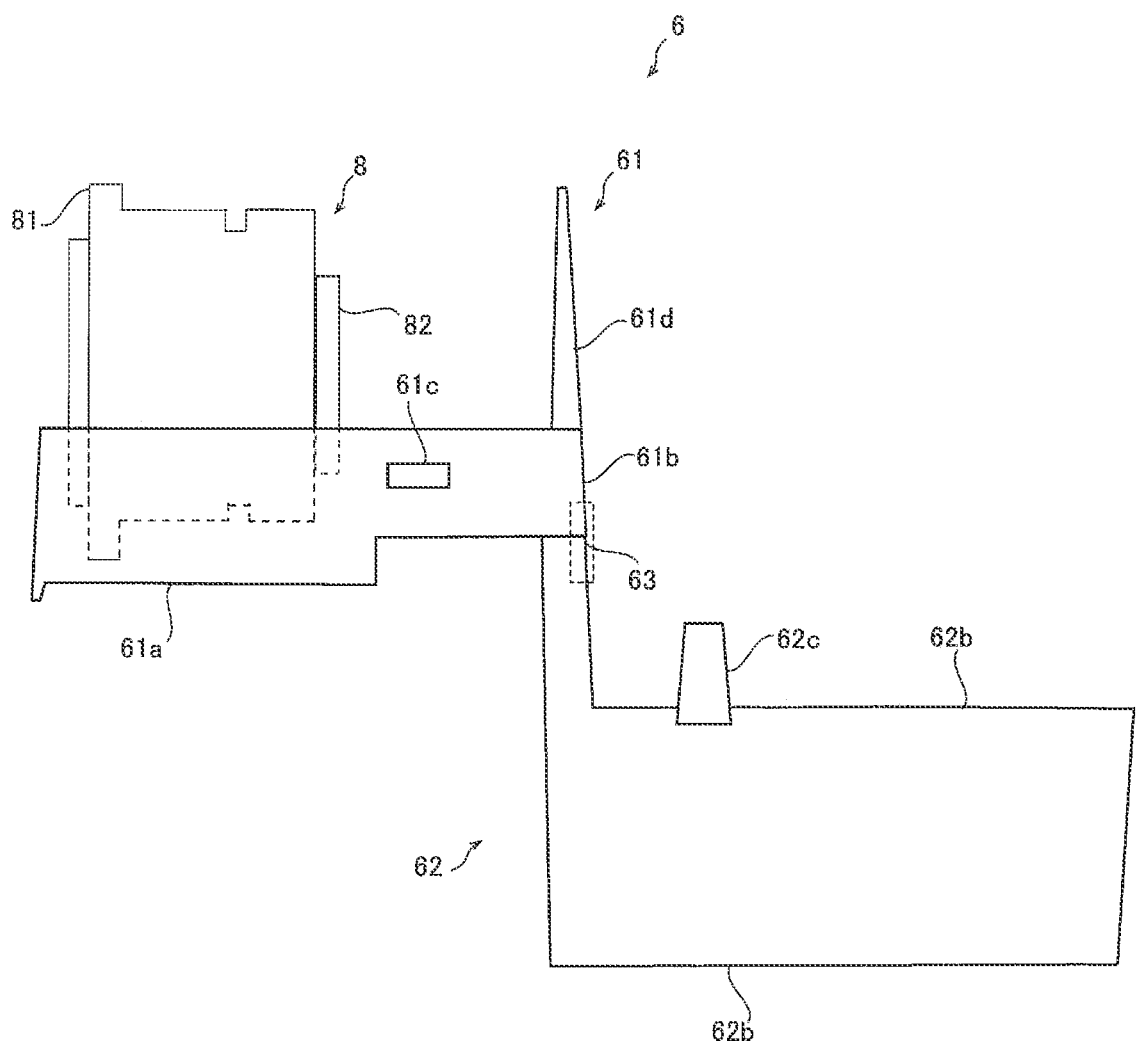
FIG. 6 is a diagram showing a speaker mounting portion according to a modification.

In the above embodiment, an example is shown in which the second portion is folded from the Y2 side toward the first portion, but the invention is not limited to this. For example, as shown in FIG. 6, the second portion may be configured to be folded from the Y1 side toward the first portion.

In the above embodiment, an example is shown in which the entire speaker is covered by the second portion, but the invention is not limited to this. For example, if the second portion covers the speaker frame and a portion (of the interior space or the speaker) on the Y2 side from the speaker frame, it is not necessary that the entire speaker is covered.

In the above embodiment, an example is shown in which the second portion is provided with the stepped portion, but the invention is not limited to this. For example, the second portion may not be provided with the stepped portion. If the stepped portion is not provided, the first portion may be provided with a portion extending in the Y direction from the protruding portion of the first portion such that the portion closely contacts the second wall portion of the second portion.

(1) In view of the state of the known technology, a display device according to a first aspect of the present disclosure comprises a display, a rear frame, a speaker, and a speaker mounting portion. The rear frame is disposed on a rear side of the display. The speaker includes a speaker frame that is provided on a sound output side from which sound is output. The speaker is mounted to a rear side of the rear frame. The speaker mounting portion mounts the speaker to the rear frame. The speaker mounting portion includes a first portion that holds the speaker and is fixedly attached to the rear frame, and a second portion that is integrally formed with the first portion and is foldable against the first portion. The second portion contacts the speaker frame of the speaker in a folded state in which the second portion is folded against the first portion.

(2) In accordance with a preferred embodiment according to the display device mentioned above, the second portion is connected to the first portion via a connecting portion, and the second portion is foldable against the first portion at the connecting portion.

In the display device according to the first aspect of the present disclosure, the speaker mounting portion includes the first portion that is fixedly attached to the rear frame and the second portion that is foldable against the first portion at the connecting portion connected to the first portion and contacts the speaker frame of the speaker in the folded state. The first portion and the second portion are integrally formed. This allows the first portion integrally formed with the second portion to fix the speaker to the rear frame while suppressing sound leakage by the second portion contacting the speaker frame of the speaker. As a result, unlike the case in which a box speaker is mounted, it is not necessary to separately provide a box and a mounting member, and thus the increase in the number of parts can be suppressed and the increase in the placement space for placing the speaker can be suppressed.

(3) In accordance with a preferred embodiment according to any one of the display devices mentioned above, the first portion and the second portion closely contact each other in the folded state.

(4) In accordance with a preferred embodiment according to any one of the display devices mentioned above, the first portion and the second portion have opposing portions that are opposite to each other in the folded state and closely contact each other in the folded state. This configuration can suppress the formation of a gap between the first portion and the second portion, thereby effectively suppressing the occurrence of sound leakage.

(5) In accordance with a preferred embodiment according to any one of the display devices mentioned above, the first portion includes a first wall portion that protrudes in a protruding direction from a surface of the first portion to which the speaker is mounted and contacts an outer peripheral surface of the speaker frame of the speaker, and the second portion includes a second wall portion that contacts the outer peripheral surface of the speaker frame of the speaker in the folded state and protrudes in a protruding direction that is the same as the protruding direction of the first wall portion in the folded state.

(6) In accordance with a preferred embodiment according to any one of the display devices mentioned above, the first wall portion and the second wall portion closely contact each other in the folded state.

(7) In accordance with a preferred embodiment according to any one of the display devices mentioned above, the first wall portion and the second wall portion have opposing portions that are opposite to each other in the folded state and closely contact each other in the folded state. This configuration can suppress sound leakage from the speaker by the first wall portion contacting the outer peripheral surface of the speaker frame of the speaker. In addition, the close contact between the first wall portion and the second wall portion can more effectively suppress the occurrence of sound leakage.

(8) In accordance with a preferred embodiment according to any one of the display devices mentioned above, the speaker frame of the speaker has an oval outer peripheral surface.

(9) In accordance with a preferred embodiment according to any one of the display devices mentioned above, the first portion and the second portion surround at least an outer peripheral surface of the speaker frame of the speaker in the folded state. In this configuration, sound leakage can be suppressed by surrounding at least the outer peripheral surface of the speaker frame from which sound is output by the second portion. If the second portion surrounds only the outer peripheral surface of the speaker frame, it is possible to suppress the increase in size of the second portion compared to a case in which the entire speaker is surrounded. In addition, the speaker frame has the oval outer peripheral surface. The second portion can closely contact the speaker frame even when the second portion has a flat section if the oval outer peripheral surface of the speaker frame has a flat section unlike the case where the speaker frame has a circular outer peripheral surface.

(10) In accordance with a preferred embodiment according to any one of the display devices mentioned above, the speaker frame of the speaker has a flange portion that has the outer peripheral surface.

(11) In accordance with a preferred embodiment according to any one of the display devices mentioned above, the first portion and the second portion closely contact the outer peripheral surface in the folded state.

(12) In accordance with a preferred embodiment according to any one of the display devices mentioned above, the outer peripheral surface has a flat section, and the second portion contacts the flat section of the outer peripheral surface in the folded state.

(13) In accordance with a preferred embodiment according to any one of the display devices mentioned above, the outer peripheral surface further has a curved section, and the second portion contacts the curved section of the outer peripheral surface in the folded state. In this configuration, the second portion and the speaker frame can closely contact each other because a contacting portion in which the second portion and the speaker frame contact each other can be increased by making the contacting portion flat.

(14) In accordance with a preferred embodiment according to any one of the display devices mentioned above, the outer peripheral surface has a flat section, and the first portion contacts the flat section of the outer peripheral surface.

(15) In accordance with a preferred embodiment according to any one of the display devices mentioned above, the outer peripheral surface has a curved section, and the first portion contacts the curved section of the outer peripheral surface.

(16) In accordance with a preferred embodiment according to any one of the display devices mentioned above, the first portion includes at least one first engagement portion, and the second portion includes at least one second engagement portion that is engaged with the first engagement portion in the folded state.

(17) In accordance with a preferred embodiment according to any one of the display devices mentioned above, the first engagement portion is integrally formed with the first wall portion, and the second engagement portion is integrally formed with the second wall portion. In this configuration, the first engagement portion and the second engagement portion can maintain a state in which the first wall portion and the second wall portion closely contact each other.

(18) In accordance with a preferred embodiment according to any one of the display devices mentioned above, the speaker mounting portion is integrally formed as a one-piece, unitary member.

(19) In view of the state of the known technology, a speaker mounting structure according to a second aspect of the present disclosure comprises a first portion configured to hold a speaker with a speaker frame, the first portion being mountable to another member, and a second portion integrally formed with the first portion, the second portion being foldable against the first portion at a connecting portion connected to the first portion, the second portion being configured to contact the speaker frame of the speaker in a folded state in which the second portion is folded against the first portion.

The speaker mounting structure according to the second aspect of the present disclosure can fix the speaker to another member by the first portion integrally formed with the second portion while suppressing sound leakage by the second portion contacting the speaker frame of the speaker. As a result, unlike the case in which a box speaker is mounted, it is not necessary to separately provide a box and a mounting member, and the increase in the number of parts can be suppressed and the placement space for placing the speaker can be reduced.

(20) In accordance with a preferred embodiment according to the speaker mounting structure mentioned above, the first portion and the second portion are integrally formed as a one-piece, unitary member.

According to the present disclosure, as described above, it is possible to provide a display device and a speaker mounting structure that can suppress the increase in the number of parts and to suppress the increase in the placement space for placing the speaker.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position on a horizontal surface. Accordingly, these directional terms, as utilized to describe the display device should be interpreted relative to a display device on a horizontal surface. The terms "left" and "right" are used to indicate the "right" when referencing from the right side as viewed from the rear side of the display device, and the "left" when referencing from the left side as viewed from the rear side of the display device.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A display device comprising:
a display;
a rear frame disposed on a rear side of the display;
a speaker including a speaker frame that is provided on a sound output side from which sound is output, the speaker being mounted to a rear side of the rear frame; and
a speaker mounting portion mounting the speaker to the rear frame, the speaker mounting portion including
a first portion that holds the speaker and is fixedly attached to the rear frame, and
a second portion that is integrally formed with the first portion and is foldable against the first portion, the second portion contacting the speaker frame of the speaker in a folded state in which the second portion is folded against the first portion,
the first portion and the second portion surrounding at least an outer peripheral surface of the speaker frame of the speaker in the folded state.
2. The display device according to claim 1, wherein the first portion and the second portion closely contact each other in the folded state.
3. The display device according to claim 1, wherein the first portion and the second portion have opposing portions that are opposite to each other in the folded state and closely contact each other in the folded state.
4. A display device comprising:
a display;
a rear frame disposed on a rear side of the display;
a speaker including a speaker frame that is provided on a sound output side from which sound is output, the speaker being mounted to a rear side of the rear frame; and
a speaker mounting portion mounting the speaker to the rear frame, the speaker mounting portion including
a first portion that holds the speaker and is fixedly attached to the rear frame, and
a second portion that is integrally formed with the first portion and is foldable against the first portion, the second portion contacting the speaker frame of the speaker in a folded state in which the second portion is folded against the first portion,
the first portion including a first wall portion that protrudes in a protruding direction from a surface of the first portion to which the speaker is mounted and contacts an outer peripheral surface of the speaker frame of the speaker, and
the second portion including a second wall portion that contacts the outer peripheral surface of the speaker frame of the speaker in the folded state and protrudes in a protruding direction that is the same as the protruding direction of the first wall portion in the folded state.
5. The display device according to claim 4, wherein the first wall portion and the second wall portion closely contact each other in the folded state.
6. The display device according to claim 4, wherein the first wall portion and the second wall portion have opposing portions that are opposite to each other in the folded state and closely contact each other in the folded state.
7. The display device according to claim 1, wherein the speaker frame of the speaker has an oval outer peripheral surface.
8. The display device according to claim 1, wherein the second portion is connected to the first portion via a connecting portion, and
the second portion is foldable against the first portion at the connecting portion.
9. The display device according to claim 1, wherein the speaker frame of the speaker has a flange portion that has the outer peripheral surface.
10. The display device according to claim 9, wherein the first portion and the second portion closely contact the outer peripheral surface in the folded state.
11. The display device according to claim 1, wherein the outer peripheral surface has a flat section, and
the second portion contacts the flat section of the outer peripheral surface in the folded state.
12. The display device according to claim 11, wherein the outer peripheral surface further has a curved section, and
the second portion contacts the curved section of the outer peripheral surface in the folded state.
13. The display device according to claim 1, wherein the outer peripheral surface has a flat section, and
the first portion contacts the flat section of the outer peripheral surface.
14. The display device according to claim 13, wherein the outer peripheral surface has a curved section, and
the first portion contacts the curved section of the outer peripheral surface.
15. The display device according to claim 4, wherein the first portion includes at least one first engagement portion, and
the second portion includes at least one second engagement portion that is engaged with the first engagement portion in the folded state.
16. The display device according to claim 15, wherein the first engagement portion is integrally formed with the first wall portion, and
the second engagement portion is integrally formed with the second wall portion.
17. The display device according to claim 1, wherein the speaker mounting portion is integrally formed as a one-piece, unitary member.

18. A speaker mounting structure comprising:
a first portion configured to hold a speaker with a speaker frame, the first portion being mountable to another member; and
a second portion integrally formed with the first portion, the second portion being foldable against the first portion at a connecting portion connected to the first portion, the second portion being configured to contact the speaker frame of the speaker in a folded state in which the second portion is folded against the first portion,
the first portion and the second portion being further configured to surround at least an outer peripheral surface of the speaker frame of the speaker in the folded state.

19. The speaker mounting structure according to claim 18, wherein
the first portion and the second portion are integrally formed as a one-piece, unitary member.

* * * * *